United States Patent
Baehr et al.

(10) Patent No.: US 10,393,197 B2
(45) Date of Patent: Aug. 27, 2019

(54) METHOD FOR CONTROLLING A HYDRAULIC ACTUATOR

(71) Applicant: Schaeffler Technologies AG & Co. KG, Herzogenaurach (DE)

(72) Inventors: Markus Baehr, Bühl (DE); Dominik Herkommer, Schriesheim (DE); Andre Schauer, Bühl (DE); Marco Grethel, Bühlertal (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 115 days.

(21) Appl. No.: 15/556,399

(22) PCT Filed: Feb. 23, 2016

(86) PCT No.: PCT/DE2016/200104
§ 371 (c)(1),
(2) Date: Sep. 7, 2017

(87) PCT Pub. No.: WO2016/141935
PCT Pub. Date: Sep. 15, 2016

(65) Prior Publication Data
US 2018/0106305 A1    Apr. 19, 2018

(30) Foreign Application Priority Data
Mar. 11, 2015 (DE) .................. 10 2015 204 383

(51) Int. Cl.
F16D 48/06 (2006.01)
F16D 48/02 (2006.01)
(Continued)

(52) U.S. Cl.
CPC ........... *F16D 48/066* (2013.01); *F16D 25/14* (2013.01); *F16D 31/00* (2013.01); *F16D 48/06* (2013.01);
(Continued)

(58) Field of Classification Search
None
See application file for complete search history.

(56) References Cited

FOREIGN PATENT DOCUMENTS

| | | |
|---|---|---|
| DE | 10221701 A1 | 11/2002 |
| DE | 102011121880 A1 | 6/2013 |

(Continued)

OTHER PUBLICATIONS

DE102011121880 machine translation (Year: 2013).*
(Continued)

*Primary Examiner* — Timothy Hannon
(74) *Attorney, Agent, or Firm* — Reid A. Baldwin

(57) ABSTRACT

A method for adjusting and adapting an operating point of a hydraulic actuator arrangement, in which a volume flow source is connected to a hydraulic cylinder via a pressure line that is filled with a hydraulic fluid. The method includes regulating a volume of the hydraulic fluid by the volume flow source, wherein an operating point of a position of the actuator arrangement corresponds, with respect to a predefined parameter, to a device which is to be actuated by the actuator arrangement. A modified volume of the hydraulic fluid which is necessary to adjust the operating point is derived from a rotational position of a volume flow source motor and/or of the volume flow source.

18 Claims, 3 Drawing Sheets

(51) Int. Cl.
*F16D 31/00* (2006.01)
*F16H 61/06* (2006.01)

(52) U.S. Cl.
CPC ..... *F16H 61/06* (2013.01); *F16D 2500/1024* (2013.01); *F16D 2500/1045* (2013.01); *F16D 2500/10412* (2013.01); *F16D 2500/3021* (2013.01); *F16D 2500/3024* (2013.01); *F16D 2500/3025* (2013.01); *F16D 2500/5014* (2013.01); *F16D 2500/5041* (2013.01); *F16D 2500/50236* (2013.01); *F16D 2500/50239* (2013.01); *F16D 2500/50245* (2013.01); *F16D 2500/50287* (2013.01); *F16D 2500/70416* (2013.01); *F16D 2500/70418* (2013.01); *F16D 2500/70605* (2013.01); *F16D 2500/70626* (2013.01)

(56) References Cited

FOREIGN PATENT DOCUMENTS

| | | |
|---|---|---|
| DE | 102012021211 A1 | 4/2014 |
| EP | 0497293 A1 | 8/1992 |
| JP | H0777168 A1 | 3/1995 |

OTHER PUBLICATIONS

JPH0777168 machine translation (Year: 1995).*
English translation of International Search Report for PCT/DE2016/200104; 2 pgs; dated Jun. 27, 2016 by European Patent Office.

* cited by examiner

METHOD FOR CONTROLLING A HYDRAULIC ACTUATOR

CROSS-REFERENCE TO RELATED APPLICATIONS

This application is the U.S. National Phase of PCT Appln. No. PCT/DE2016/200104 filed Feb. 23, 2016, which claims priority to German Application No. DE 10 2015 204 383.5 filed Mar. 11, 2015, the entire disclosures of which are incorporated by reference herein.

TECHNICAL FIELD

The disclosure relates to a method for adjusting and adapting an operating point of a hydraulic actuator arrangement, in which a volume flow source is connected to a hydraulic cylinder via a pressure line which is filled with a hydraulic fluid, a volume of the hydraulic fluid being regulated by means of the volume flow source and the operating point of a position of the actuator arrangement corresponds, with respect to a predefined parameter, to a device which is to be actuated by the actuator arrangement. Also provided is a method for actuating a clutch of a motor vehicle drive train and a hydraulic actuator arrangement.

BACKGROUND

Hydraulic actuator arrangements are used widely, in particular in motor vehicles. For example, they can be used to actuate a friction clutch or to automatically engage gears in automatic transmissions. Such hydraulic actuator arrangements as a result have specific operating points in the form of a position at which a gear is engaged or a clutch begins to transmit a first torque. Because of wear and tear of these hydraulic actuator arrangements, the operating points are however subject to changes, which have to be compensated during operation.

DE 10 2012 021 211 A1 discloses a method for determining an adjustment parameter for a hydraulic actuator arrangement in a motor vehicle drive train. This hydraulic actuator arrangement comprises a pump and a hydraulic cylinder, wherein a pressure connection of the pump is connected to a connection of the hydraulic cylinder. The adjustment parameter here represents a function of the volume of the fluid which is to be delivered by the pump in order to set a predetermined operating point of the actuator arrangement. The operating point is defined here by a value pair of an operating point rotational speed value of the pump and an operating point drive value of the pump. This is carried out by controlling the pump to the operating point rotational speed value, so that the pump delivers a fluid volume flow corresponding to the operating point rotational speed value. The fluid volume is then integrated over time as far as a final operating state of the actuator arrangement in which the drive value of the pump is less than or equal to the operating point drive value. The disadvantage with this arrangement is the high computing capacity which is needed to adjust the operating point.

SUMMARY

The disclosure is based on the object of specifying a method for adjusting the operating point in which the operating point can be determined quickly and nevertheless accurately.

According to the disclosure, the object is achieved in that the volume of the hydraulic fluid which is necessary to adjust the operating point is derived from a rotational position of a volume flow source motor and/or of the volume flow source. This has the advantage that the proportionality between the volume which is delivered by the volume flow source, for example a pump or a hydrostatic transmitter piston, and the angular position of the volume flow source is utilized, since a predefined volume stroke per revolution of the volume flow source follows. By using the rotational angle of the volume flow source or of the motor and the fixed relationship between rotational angle and volume which is delivered, the characteristic curve of the hydraulic actuator arrangement can be created reliably, preferably in low pressure ranges. Since the rotational angle of the volume flow source is measured directly, it is possible to dispense with the integration of the volume flow of the hydraulic fluid.

Advantageously, in order to determine the rotational position, a current rotational angle of the volume flow source motor and/or of the volume flow source is measured, which is regulated to a reference rotational angle of a preceding rotational angle control cycle of the rotational angle regulation. In each rotational angle control cycle, in accordance with the operating point to be adjusted, a specific volume is calculated, which represents the output from the rotational angle control cycle and is led to a feedforward control system in order to adjust the reference rotational angle. This leads to it being possible for a desired operating point always to be set reliably by using the changing reference rotational angle.

In one configuration, the volume of the hydraulic fluid is determined by multiplying the measured rotational angle by a volume of the volume flow source per unit angle. Since the volume of the volume flow source per unit angle represents a fixed operating variable of the volume flow source, a proportional relationship between the rotational angle of the volume flow source or of the volume flow source motor and of the volume delivered can be determined simply.

In one embodiment, the new volume for adjusting the operating point is adapted from a measured actual pressure or the measured actual rotational angle. The actual rotational angle is advantageously previously converted into an actual volume.

In one configuration, the operating point is defined by a predefined pressure, wherein, when this predefined pressure is reached, the actual volume derived from the measured actual rotational angle is determined as the new volume of the operating point, which is supplied to a controller for determining the reference rotational angle and/or the reference pressure.

In one variant, the volume of the hydraulic fluid which is necessary to adjust the operating point is set via the rotational angle regulation below a predefined operating point and via a pressure regulation above the predefined operating point. This ensures that an accurate characteristic curve can be determined in an extremely wide range of positions of the hydraulic actuator arrangement since, in the regions where the pressure values can be measured only inadequately, the pressure regulation is replaced by the rotational angle regulation.

In one embodiment, the rotational angle regulation and the pressure regulation are superimposed in the area of the predefined operating point. By means of a comparison of the results determined via the pressure regulation or via the rotational angle regulation, the operating point can be verified particularly simply.

In one configuration, a point of contact of a clutch is used as predefined operating point. Here, the point of contact is understood to mean the position of the hydraulic actuator arrangement at which, with a force <10 N, the clutch begins to engage and transmits a torque.

Since, in the hydraulic clutch actuator arrangement, only little leakage is expected, a calculated leakage is taken into account when determining the volume of the hydraulic fluid. Here, it is expedient to adapt the leakage only above a certain pressure. The leakage parameters are determined from a volume flow source angle and the actual pressure. The leakage rate is determined from the pressure by using these parameters. The leakage volume is calculated by integration of the leakage rate over time.

A development of the disclosure relates to a method for actuating a clutch of a motor vehicle drive train which comprises a hydraulic actuator arrangement, in which a volume flow source is connected to a hydraulic cylinder via a pressure line filled with a hydraulic fluid, a volume of the hydraulic fluid being regulated by means of the volume flow source. In such a method, the volume of the hydraulic fluid is determined in accordance with at least one feature explained in this protective rights application. Therefore, a highly precise adjustment of the actuator characteristic curve is achieved, which means that a precise operating point determination is possible.

In one configuration, the volume of the hydraulic fluid is used as a feedforward control value in a control loop which regulates a position and/or a pressure of the clutch by means of the hydraulic actuator arrangement. On the basis of the accurate adjustment of the operating point of the actuator arrangement, the operating point of the clutch can also be reproduced highly accurately.

A further development of the disclosure relates to a hydraulic actuator arrangement, preferably for a motor vehicle drive train, comprising a volume flow source driven by a motor, which is connected to a hydraulic cylinder via a pressure line. In such a hydraulic actuator arrangement, computing capacities are reduced, since an angle sensor for measuring a rotational angle of the motor or of the volume flow source is arranged on the motor and/or the volume flow source in order to provide an input variable for an operating point determination of the actuator arrangement. The use of such an angle sensor permits a simple determination of the volume to be delivered on the basis of a proportional relationship between the measured rotational angle and the delivered volume of the hydraulic fluid.

Advantageously, a pressure sensor, which in particular is formed as a multi-turn sensor, in which the rotational angle can be counted over several revolutions of the motor or of the volume flow source, is positioned in the hydraulic cylinder.

BRIEF DESCRIPTION OF THE DRAWINGS

The disclosure permits numerous embodiments. One of these is to be explained in more detail by using the figures illustrated in the drawing, in which.

DETAILED DESCRIPTION

Figure 1:
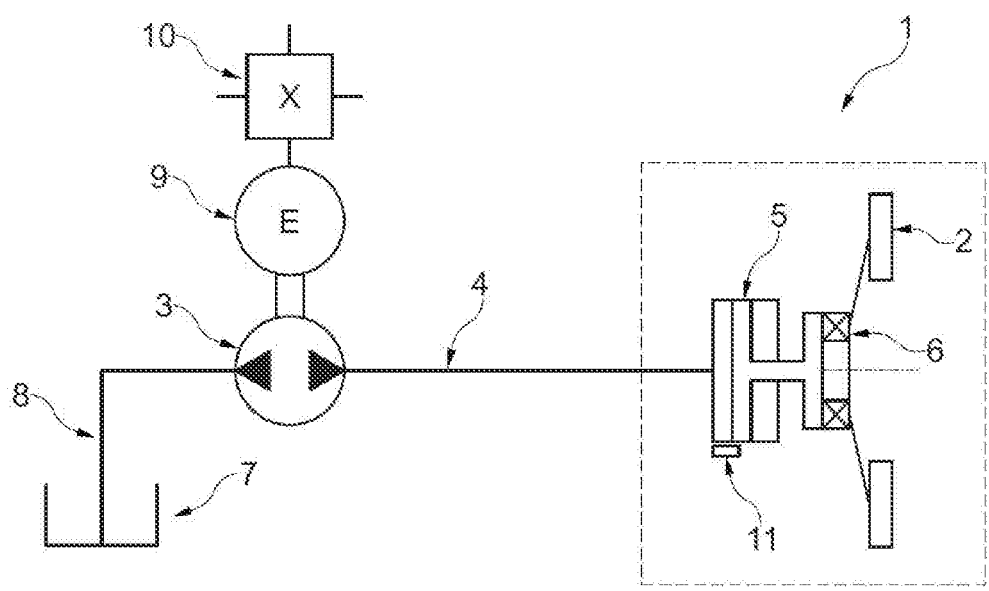
FIG. 1 shows an exemplary embodiment of a hydraulic actuator arrangement according to the disclosure.

FIG. 1 shows an exemplary embodiment of a hydraulic clutch actuator arrangement 1 according to the disclosure, as is used, for example, in a drive train of a motor vehicle, wherein the hydraulic clutch actuator arrangement 1 is used to actuate a clutch 2. A volume flow source, formed as a pump 3 by way of example, is connected via a high-pressure hydraulic line 4 to a hydraulic cylinder 5, which acts on the clutch 2 via an engagement bearing 6. Via the pump 3, hydraulic fluid is taken in by the pump 3 from a hydraulic reservoir 7 via a low-pressure hydraulic line 8 and supplied to the hydraulic cylinder 5 via the high-pressure hydraulic line 4. By means of the hydraulic fluid, a piston of the hydraulic cylinder 5 is displaced, by means of which the engagement bearing 6 is moved and the clutch 2 is likewise displaced.

The pump 3 is driven by an electric motor 9, on which there is positioned an angle sensor 10, which determines the rotational position of the electric motor 9 in the form of a rotational angle $\varphi$. Positioned in the hydraulic cylinder 5 is a pressure sensor 11 for measuring the pressure p of the hydraulic fluid established in the high-pressure hydraulic line 4. The angle sensor 10 can preferably be formed here as a multi-turn sensor, which even detects the rotational angle over 360°.

Given sufficiently fast rotation of the pump 3, leakage can be disregarded or represented reproducibly, so that a clutch characteristic curve which represents a clutch torque M over the rotational angle $\varphi$ can be created. Such a clutch characteristic curve is illustrated in FIG. 2a. Likewise, a clutch characteristic curve over a volume V instead of the rotational angle $\varphi$ can be determined, wherein the volume V can be determined without any integration step by multiplying the rotational angle $\varphi$ by the pump volume per unit angle.

Figure 2:
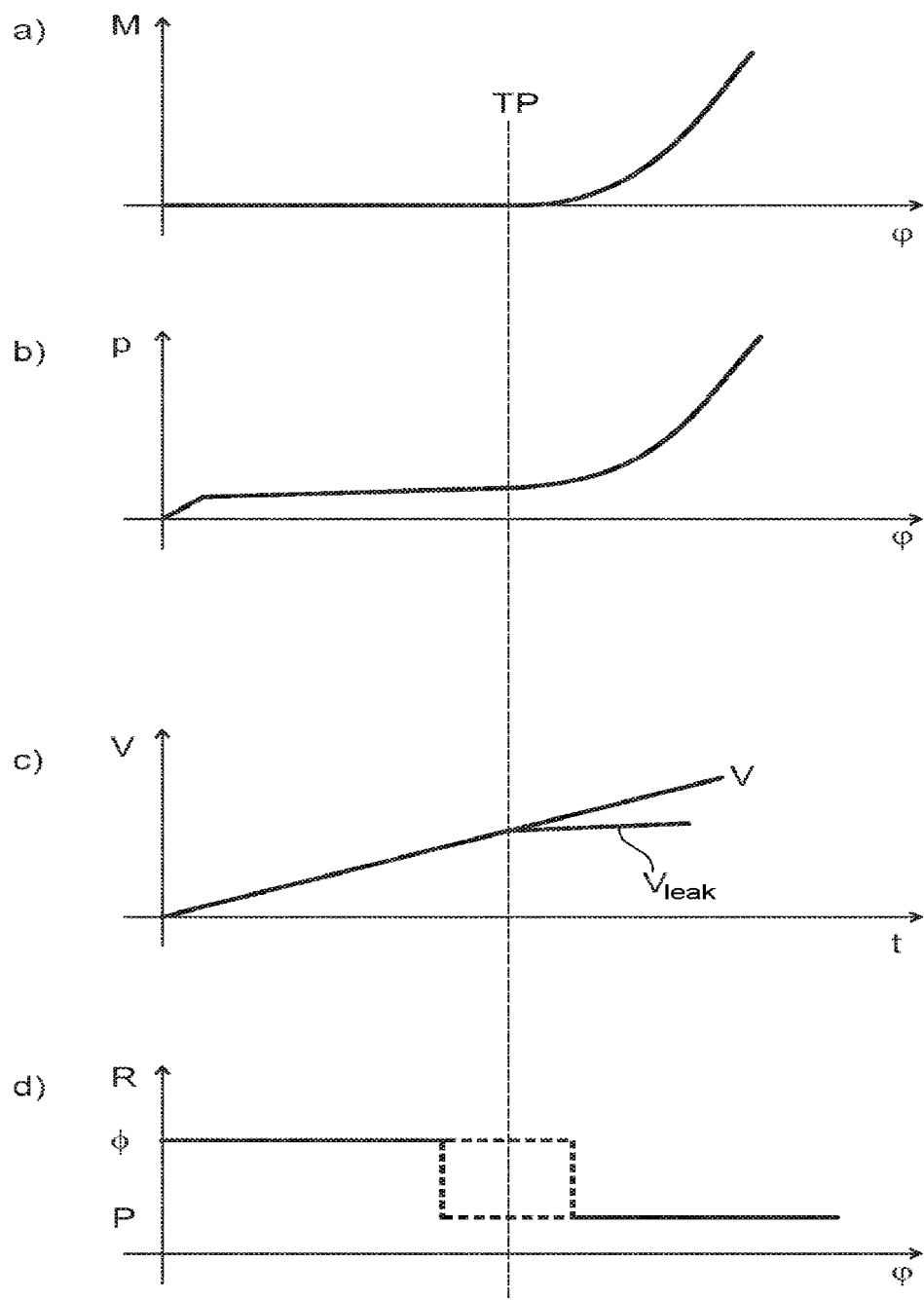
FIG. 2 shows a profile of operating parameters of the hydraulic actuator arrangement when engaging a directly actuated clutch by means of the method according to the disclosure.

FIG. 2b shows an actuator characteristic curve, in which the pressure p of the hydraulic fluid acting in the hydrostatic actuator arrangement 1 is illustrated over the rotational angle $\varphi$ of the electric motor 9 or of the pump. The delivered volume V over the time t is shown in FIG. 2c. The ideal delivered volume V, without taking a leakage rate into account, results in a linear relationship, wherein, in the event that a leakage rate occurs, the volume curve $V_{leak}$ decreases over time, the decrease already beginning before the point of contact. The point of contact TP that is important for the characteristic curves is identified in all the graphs of FIG. 2, wherein the point of contact TP is understood to mean the position of the clutch actuator arrangement 1 at which the clutch 2 begins to transmit a torque.

Since the pump 3 has a certain leakage, the rotational angle $\varphi$ cannot be used or cannot be used exclusively over a relatively long time period t, in particular at higher pressures p or when maintaining the pressure p. Therefore, upon reaching an operating point which has been reached via the rotational angle $\varphi$, for example in the form of the point of contact TP, the drive strategy of the clutch actuator arrangement 1 is changed, as emerges from FIG. 2d. Here, a change is made from the rotational angle regulation R to a pressure regulation P. The control model is plotted on the Y axis of FIG. 2d. The pressure regulation P is implemented, for example, in a PID or state controller. The changeover from the rotational angle regulation R to the pressure regulation P is preferably carried out in the vicinity of or directly at the point of contact TP. This preferred region is identified by a dashed line.

Figure 3:
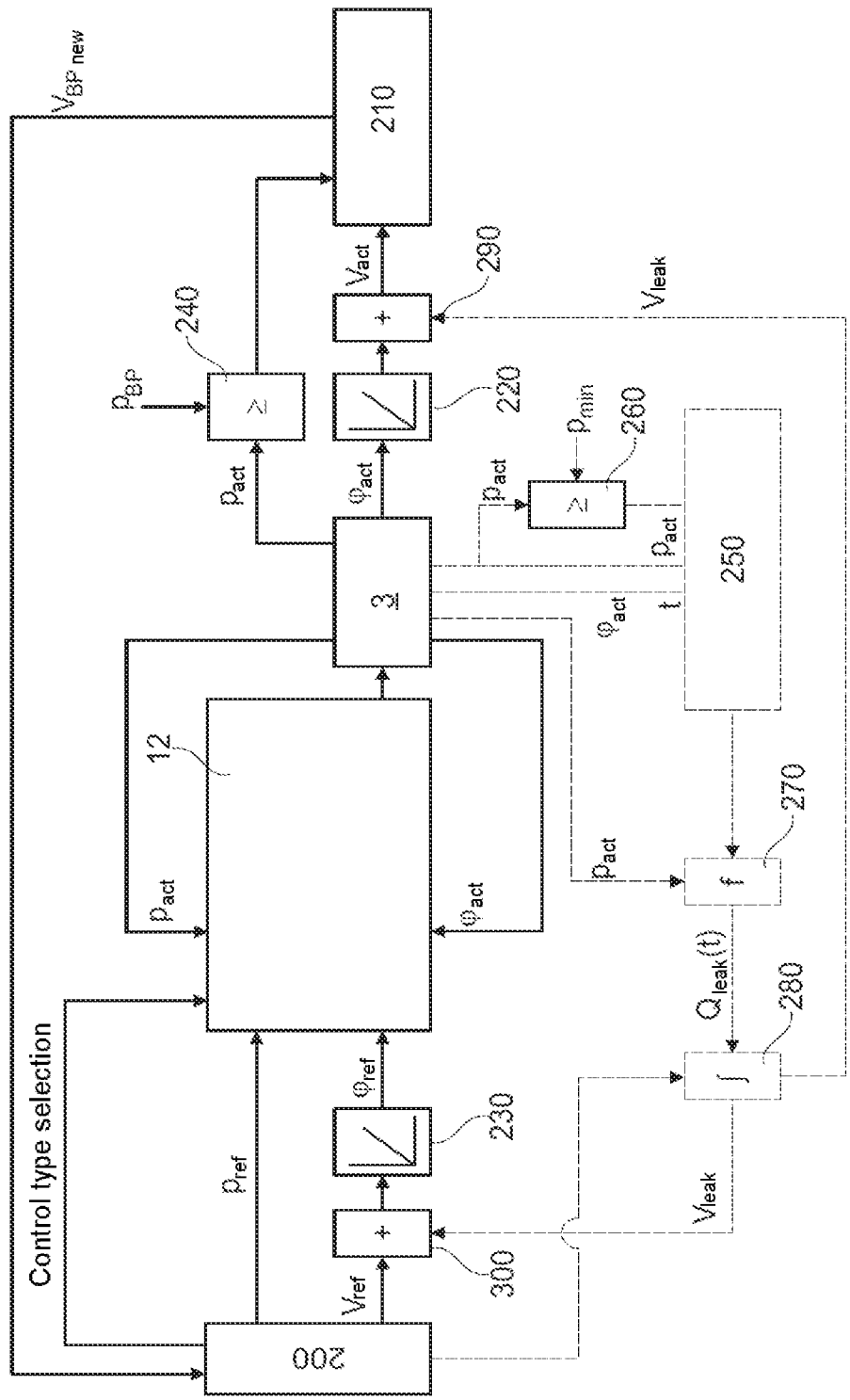
FIG. 3 shows an exemplary embodiment of the method according to the disclosure.

An exemplary embodiment of the method according to the disclosure, which is formed as a control loop, is illustrated in FIG. 3. Illustrated is an implementation with a combined pressure/displacement regulation 12, in which the control type can be changed over between pressure p and rotational angle φ of the pump. Here, the pressure regulation is used in working ranges with high pressure gradients. The pump angle regulation is carried out in working ranges with low pressure gradients. This is carried out as a function of the pressure p which is exerted by the hydraulic fluid in the clutch arrangement 1. The changeover can be made during an actuation of engaged clutches above a pressure limit. The selection of the respective control method is made via a controller. The controller predefines a reference pressure $p_{ref}$ and/or a reference volume $V_{ref}$.

The pressure regulation P is traditionally carried out by taking into account the control difference between the reference pressure value $p_{ref}$ and the actual pressure value $p_{act}$. Depending on the selection output by the control system in block 200, the appropriate output signal from the pressure regulation or the rotational angle regulation is passed on to the pump 3. The reference volume $V_{ref}$ is converted via the pump characteristic value: volume per unit angle, into a reference angle $\varphi_{ref}$. The difference from this actual rotational angle $\varphi_{act}$ measured by the angle sensor 10 and the newly calculated reference angle $\varphi_{ref}$ forms the input to the rotational angle regulation.

With the aid of the rotational angle $\varphi_{act}$ determined on the pump 3 and the actual pressure $p_{act}$ of the pressure p, which is determined by means of the pressure sensor 11 in the hydraulic cylinder 5, a volume $V_{BPnew}$ for setting a new operating point is adapted (block 210). For this purpose, the actual rotational angle $\varphi_{act}$ is previously converted into an actual volume $V_{act}$ (block 220). This new volume $V_{BPnew}$ of the hydraulic fluid is applied to the control system in block 200, which determines the reference value $V_{ref}$ of the volume V from this new volume $V_{BPnew}$, which corresponds to the new operating point. Via the linear relationship between volume V and rotational angle φ, a reference rotational angle $\varphi_{ref}$ is also calculated from the reference volume $V_{ref}$ (block 230). From this reference rotational angle $\varphi_{ref}$ and the actual rotational angle $\varphi_{act}$, the difference is determined and is supplied to the rotational angle regulation, which regulates the actual rotational angle $\varphi_{act}$ to the reference value $\varphi_{ref}$.

The operating point to be adapted is defined via a pressure $p_{BP}$ (block 240). Once this pressure $p_{BP}$ is reached, the actual volume $V_{act}$, which has been derived from the actual rotational angle $\varphi_{act}$, is defined as a new volume $V_{BPnew}$ of the operating point at this time and is output to the control system (block 200).

The rotational angle regulation can optionally take into account a calculated leakage $V_{leak}$, in order to improve the results of the rotational angle regulation. For the purpose of adaptation of the leakage $V_{leak}$, the actual rotational angle $\varphi_{act}$ and the actual pressure $p_{act}$ are likewise used. Here, the actual pressure $p_{act}$ is used for the adaptation of the leakage (block 250) only when the actual pressure $p_{act}$ is greater than/equal to a predefined threshold value $-p_{min}$ (block 260). The leakage rate $Q_{leak(t)}$ calculated from the actual rotational angle $\varphi_{act}$ and the actual pressure $p_{act}$ in block 270 is integrated in block 280. The result of this integration over time represents the leakage volume $V_{leak}$, which is taken into account both in the determination of the actual volume value $V_{act}$ (block 290) and in the determination of the reference volume value $V_{ref}$ (block 300). The path of the leakage feedforward control is illustrated dashed in FIG. 3.

A comparison of the operating point that is moved to with the stored reference value $V_{ref}$ or $p_{ref}$ can be made via the pressure or, if the operating point moved to lies above the point of contact, via the clutch torque. In addition, despite changing over the regulation, the rotational angle can continue to be followed in the software and the associated parameters can be compared.

LIST OF REFERENCE NUMBERS

1 Hydraulic clutch actuator
2 Clutch
3 Pump
4 High-pressure hydraulic line
5 Hydraulic cylinder
6 Engagement bearing
7 Hydraulic reservoir
8 Low-pressure hydraulic line
9 Electric motor
10 Angle sensor
11 Pressure sensor
12 P/φ regulation
$\varphi_{act}$ Actual rotational angle
$\varphi_{ref}$ Reference rotational angle
$V_{ref}$ Reference volume
$V_{act}$ Actual volume
$V_{act\ new}$ New actual volume
$p_{act}$ Actual pressure
$p_{ref}$ Reference pressure

The invention claimed is:

1. A method for adjusting and adapting an operating point of a hydraulic actuator arrangement, in which a volume flow source is connected to a hydraulic cylinder via a pressure line which is filled with a hydraulic fluid, the method comprising:

regulating a volume of the hydraulic fluid by the volume flow source, wherein an operating point of a position of the actuator arrangement corresponds, with respect to a predefined parameter, to a device which is to be actuated by the actuator arrangement, and wherein a modified volume of the hydraulic fluid which is necessary to adjust the operating point is derived from a rotational position of the volume flow source.

2. The method as claimed in claim 1, wherein to determine the rotational position, a current rotational angle of the volume flow source is measured, which is regulated to a reference rotational angle of a preceding rotational angle control cycle of a rotational angle regulation which is contained in a pressure/angle regulator.

3. The method as claimed in claim 2, wherein the volume of the hydraulic fluid is determined by multiplying the measured current rotational angle by the volume of the volume flow source per unit rotational angle.

4. The method as claimed in claim 3, wherein a calculated leakage is taken into account when determining the volume of the hydraulic fluid.

5. The method as claimed in claim 2, wherein the modified volume of the hydraulic fluid which is necessary to adjust the operating point is set via the rotational angle regulation below a predefined operating point and via a pressure regulation executed by the pressure/angle regulator above the predefined operating point.

6. The method as claimed in claim 5, wherein the rotational angle regulation and the pressure regulation are superimposed in an area of the predefined operating point.

7. The method as claimed in claim 5, wherein a point of contact of the device is used as the predefined operating point.

8. The method as claimed in claim 1, wherein the modified volume of the hydraulic fluid is used as a feedforward control value in a control loop which regulates one of a position and/or a pressure of the device by the hydraulic actuator arrangement.

9. The method as claimed in claim 1, wherein the device is a clutch.

10. A method for adjusting and adapting an operating point of a hydraulic actuator arrangement, in which a volume flow source is driven by a volume flow source motor and is connected to a hydraulic cylinder via a pressure line which is filled with a hydraulic fluid, the method comprising:

regulating a volume of the hydraulic fluid by the volume flow source, wherein an operating point of a position of the actuator arrangement corresponds, with respect to a predefined parameter, to a device which is to be actuated by the actuator arrangement, and wherein a modified volume of the hydraulic fluid which is necessary to adjust the operating point is derived from a rotational position of the volume flow source motor.

11. The method as claimed in claim 10, wherein to determine the rotational position, a current rotational angle of the volume flow source motor is measured, which is regulated to a reference rotational angle of a preceding rotational angle control cycle of a rotational angle regulation which is contained in a pressure/angle regulator.

12. The method as claimed in claim 11, wherein the volume of the hydraulic fluid is determined by multiplying the measured current rotational angle by the volume of the volume flow source per unit rotational angle.

13. The method as claimed in claim 12, wherein a calculated leakage is taken into account when determining the volume of the hydraulic fluid.

14. The method as claimed in claim 11, wherein the modified volume of the hydraulic fluid which is necessary to adjust the operating point is set via the rotational angle regulation below a predefined operating point and via a pressure regulation executed by the pressure/angle regulator above the predefined operating point.

15. The method as claimed in claim 14, wherein the rotational angle regulation and the pressure regulation are superimposed in an area of the predefined operating point.

16. The method as claimed in claim 14, wherein a point of contact of the device is used as the predefined operating point.

17. The method as claimed in claim 10, wherein the modified volume of the hydraulic fluid is used as a feedforward control value in a control loop which regulates one of a position and a pressure of the device by the hydraulic actuator arrangement.

18. The method as claimed in claim 10, wherein the device is a clutch.

* * * * *